UNITED STATES PATENT OFFICE.

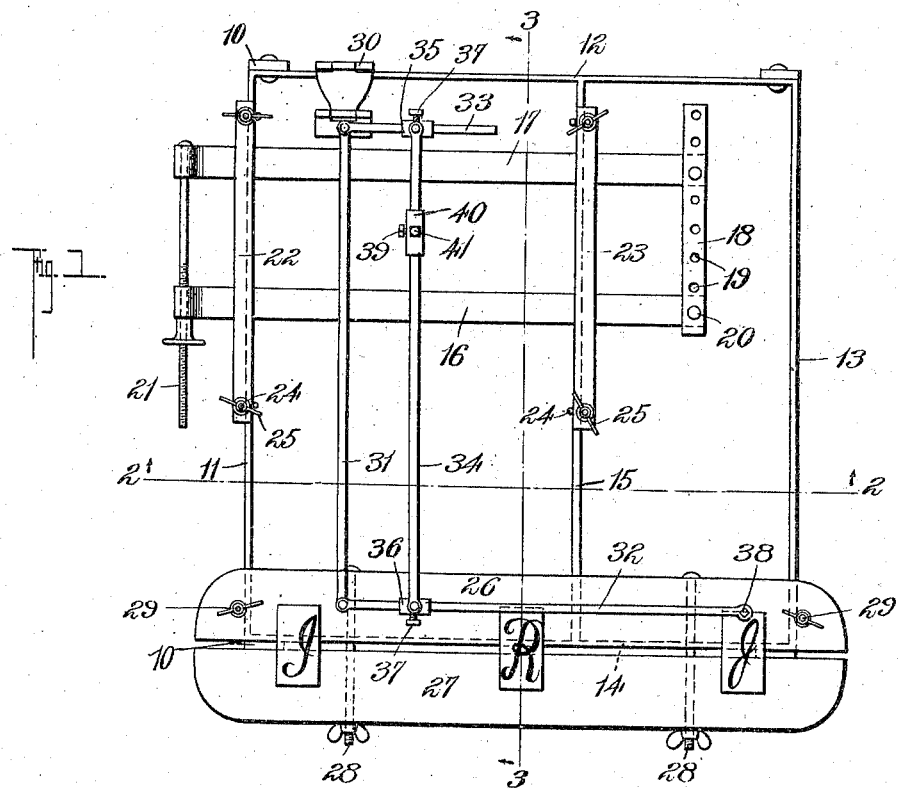
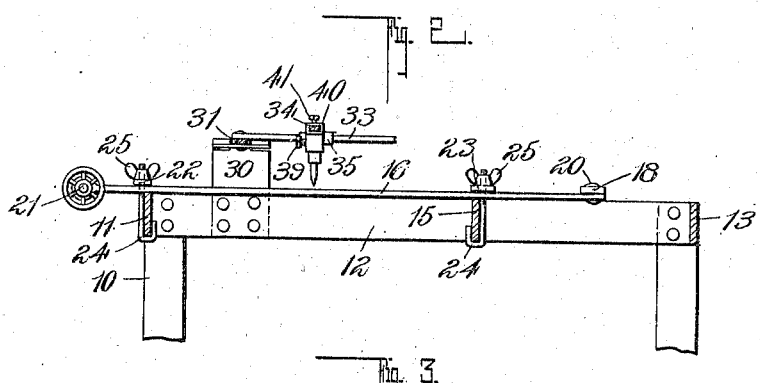
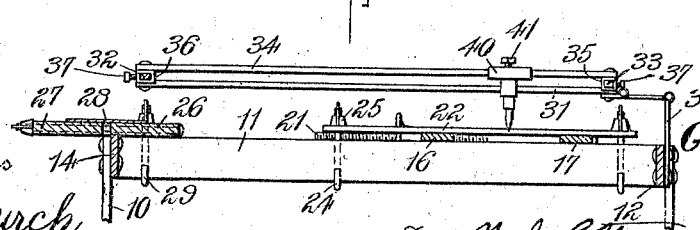

GEORGE THOMAS SUMMERS, OF RUSSELLVILLE, KENTUCKY.

ENGRAVING-MACHINE.

957,912.  Specification of Letters Patent. Patented May 17, 1910.

Application filed August 19, 1909. Serial No. 513,659.

*To all whom it may concern:*

Be it known that I, GEORGE T. SUMMERS, a citizen of the United States, residing at Russellville, in the county of Logan and State of Kentucky, have invented certain new and useful Improvements in Engraving-Machines, of which the following is a specification.

My invention is an engraving machine of the pantograph type, in which the engraving needle depends for its movement upon the movement of a tracing-style upon a form or templet, through a system of movement reproducing levers, and my object is to provide a novel adjustable lever system so mounted as to be capable of movement entirely out of the operator's way when clamping the templet and work in position.

Another object is to provide novel, adjustable templet and work clamps.

Other objects, and the advantages, of my present invention will be apparent from the following description, reference being had to the accompanying drawing, in which—

Figure 1 is a plan view of my improved machine; Fig. 2 is a cross section therethrough on line 2—2 of Fig. 1, and Fig. 3 is a similar view on line 3—3 of Fig. 1.

In accordance with my invention I provide an open rectangular frame which may be supported by legs 10 depending from the corners thereof, and which comprises sides 11, 12, 13 and 14, and a cross bar 15 connecting sides 12 and 14 and parallel with sides 11 and 13. Parallel work clamping bars 16 and 17 are arranged to extend upon the frame side 11 and cross bar 15, parallel with the side 12, and adjacent the same, bar 17 being pivotally connected at its inner end to a connecting bar 18 having a longitudinal series of openings 19, with a selected one of which the inner end of bar 16 may be coupled by means of a bolt 20. The bars 16 and 17 extend outwardly beyond the frame side 11, and are connected at their outer ends by an adjusting screw 21, and said bars are held upon the frame by means of bars 22 and 23 arranged across the same respectively above the frame bars 11 and 15, bars 22 and 23 having bolts 24 transversely through their ends, provided with lower hooked ends to engage said frame bars, and upper threaded ends for the reception of winged nuts 25.

The templet clamp comprises a pair of parallel jaw members 26 and 27 connected adjacent their ends by transverse adjusting screws 28, and extending the entire length of frame side 14, the member 26 having transverse bolts 29 at its ends, similar to the bolts 24 of bars 22 and 23, to engage the frame sides 11 and 13.

Secured by its vertical leaf to the frame side 12 adjacent frame side 11, is a hinge 30, to the upper horizontal leaf of which is pivotally connected the rear end of the guide arm 31, which guide arm extends substantially parallel with frame side 11 and is pivotally connected at its forward end to one end of the tracer arm 32 extending parallel above the templet clamp and at right angles to said guide arm 31. Pivotally connected to, and extending angularly from, the rear pivot of the guide arm 31 is a second short guide arm 33. The engraving arm 34 is pivotally connected at its ends to sleeves 35 and 36, respectively, fitting on the short guide arm 33 and the tracer arm 32, and extends parallel with the guide arm 31. Thumb nuts 37 tapped through sleeves 35 and 36, serve to clamp the engraving arm 34 in selected adjustment with respect to guide arm 31. The tracer arm 32 carries at its free end a tracing pin 38, while the engraving tool is secured by a thumb nut 39 through a sleeve 40 slidably arranged on the engraving and adapted to be secured by a thumb nut 41. Thus from the foregoing I am able to readily and quickly adjust or remove any of the parts, and to raise the arms as a whole, by means of hinge 30.

I claim:

1. In a device of the character described, a supporting frame, a work support comprising parallel clamping bars, an adjustable pivotal connection at one end of said bars, an adjustable screw connection at their opposite ends, and means detachably engaging portions of said frame to removably clamp said work support thereon in selected position.

2. In a device of the character described, a supporting frame, a clamp thereon comprising parallel clamping bars and means connecting the same for relative movement, and means detachably engaging portions of said frame to removably hold said clamp in selected position.

In testimony whereof I affix my signature, in presence of two witnesses.

GEORGE THOMAS SUMMERS.

Witnesses:
 Geo. T. Clark,
 Wesley Vick Perry.